(12) United States Patent
Xu et al.

(10) Patent No.: US 11,243,581 B2
(45) Date of Patent: Feb. 8, 2022

(54) BACKPLATE, BACKLIGHT MODULE AND DISPLAY DEVICE

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Jian Xu, Beijing (CN); Xinyin Wu, Beijing (CN); Jianbo Xian, Beijing (CN); Yong Qiao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 33 days.

(21) Appl. No.: 16/643,705

(22) PCT Filed: Sep. 19, 2019

(86) PCT No.: PCT/CN2019/106641
§ 371 (c)(1),
(2) Date: Mar. 2, 2020

(87) PCT Pub. No.: WO2020/098380
PCT Pub. Date: May 22, 2020

(65) Prior Publication Data
US 2021/0223829 A1    Jul. 22, 2021

(30) Foreign Application Priority Data
Nov. 16, 2018  (CN) .......................... 201821890459.3

(51) Int. Cl.
G02F 1/1333   (2006.01)
G06F 1/18     (2006.01)
F21V 33/00    (2006.01)

(52) U.S. Cl.
CPC .......... *G06F 1/181* (2013.01); *F21V 33/0052* (2013.01)

(58) Field of Classification Search
None
See application file for complete search history.

(56) References Cited

U.S. PATENT DOCUMENTS

2016/0306216 A1   10/2016   Que

FOREIGN PATENT DOCUMENTS

| CN | 201509363 U | 6/2010 |
| CN | 202835058 U | 3/2013 |
| CN | 104614883 A | 5/2015 |
| CN | 204347381 U | 5/2015 |
| CN | 208908128 U | 5/2019 |
| JP | 2012194464 A | 10/2012 |

OTHER PUBLICATIONS

International Search Report and Written Opinion, English Translation.

(Continued)

*Primary Examiner* — Elmito Breval
(74) *Attorney, Agent, or Firm* — Brooks Kushman P.C.

(57) ABSTRACT

The present disclosure provides a backplate, a backlight module, and a display device. The backplate of the present disclosure includes a bottom plate portion and a side wall portion, in which the bottom plate portion is provided with a plurality of crisscrossed reinforcing grooves.

19 Claims, 8 Drawing Sheets

(56) References Cited

OTHER PUBLICATIONS

CN104614883A, English Abstract and U.S. Equivalent U.S. Pub. No. 2016/0306216.
CN201509363U, English Abstract and Machine Translation.
CN202835058U, English Abstract and Machine Translation.
CN204347381U, English Abstract and Machine Translation.
CN208908128U, English Abstract and Machine Translation.
JP2012194464A, English Abstract and Machine Translation.
International Search Report and Written Opinion for Application No. PCT/CN2019/106641, dated Dec. 24, 2019, 13 Pages.

BACKPLATE, BACKLIGHT MODULE AND DISPLAY DEVICE

CROSS-REFERENCE TO RELATED APPLICATIONS

This application is the U.S. national phase of PCT Application No. PCT/CN2019/106641 filed on Sep. 19, 2019, which claims priority to Chinese Patent Application No. 201821890459.3 filed on Nov. 16, 2018, which are incorporated herein by reference in their entireties.

TECHNICAL FIELD

The present disclosure relates to the field of display technology, in particular, to a backplate, a backlight module, and a display device.

BACKGROUND

In the related art, in a backlight of a display product, the bottom surface of the backplate is generally a flat surface as a whole or is provided with a reinforcing rib (for example, an iron bar for fixing with the inner and outer surfaces through screws).

SUMMARY

An object of the present disclosure is to provide a backplate, a backlight module, and a display device.

The present disclosure provides the following technical solutions.

An embodiment of the present disclosure provides a backplate, including a bottom plate portion and a side wall portion, in which the bottom plate portion is provided with a plurality of crisscrossed reinforcing grooves.

In one embodiment, the bottom plate portion includes two long sides arranged opposite to each other and extending along a first direction; and two short sides arranged opposite to each other and extending along a second direction perpendicular to the first direction, in which a length of the long side is greater than a length of the short side, and the plurality of crisscrossed reinforcing grooves include a plurality of first grooves sequentially arranged along the first direction and each having a groove body extending along the second direction; and a plurality of second grooves sequentially arranged along the second direction and each having a groove body extending along the first direction.

In one embodiment, in the plurality of first grooves, a depth of the groove body of the first groove proximate to a center of the backplate is greater than a depth of the groove body of the first groove proximate to the short side of the backplate.

In one embodiment, in the plurality of first grooves, the depths of the groove bodies of the plurality of first grooves gradually decrease along a direction from the center of the backplate to each short side of the backplate.

In one embodiment, a minimum value of the depths of the groove bodies of the plurality of first grooves is greater than or equal to 1 mm and less than or equal to 5 mm, and a maximum value of the depths of the groove bodies of the plurality of first grooves is greater than or equal to 10 mm and less than or equal to 40 mm.

In one embodiment, the depths of the groove bodies of the plurality of second grooves are all less than a maximum value of the depths of the groove bodies of the plurality of first grooves and greater than a minimum value of the depths of the groove bodies of the plurality of first grooves.

In one embodiment, the depths of the groove bodies of the plurality of second grooves are all greater than 5 mm and less than 10 mm.

In one embodiment, in the plurality of first grooves, pitches between every two adjacent first grooves gradually increase along a direction from a center of the backplate to each short side of the backplate.

In one embodiment, in the plurality of first grooves, a minimum pitch between two adjacent first grooves is less than or equal to one fourth of a length of the long side, and a maximum pitch between two adjacent first grooves is less than or equal to one third of a length of the long side.

In one embodiment, the two long sides include a top long side located on the top and a bottom long side located on the bottom when the short sides of the backplate are in an upright state, in which the depths of the groove bodies of the plurality of second grooves are identical to each other.

In one embodiment, the two long sides include a top long side located on the top and a bottom long side located on the bottom when the short sides of the backplate are in an upright state, in which in the plurality of second grooves, a depth of the second groove proximate to the top long side is greater than a depth of the second groove proximate to the bottom long side; and/or, in the plurality of second grooves, pitches between every two adjacent second grooves gradually increase along a direction from the top long side to the bottom long side.

In one embodiment, in the plurality of second grooves, the second groove most proximate to the top long side is spaced apart from the top long side by a first distance in the second direction, the second groove most proximate to the bottom long side is apart from the bottom long side by a second distance in the second direction, and the first distance is less than the second distance.

In one embodiment, the side wall portion includes a long side wall arranged on each long side and a short side wall arranged on each short side, in which on each short side wall, a plurality of third grooves is sequentially arranged along the second direction and each of the plurality of third grooves extends along the first direction, and each second groove is arranged in such a manner as to face a gap between two corresponding third grooves adjacent to each other.

In one embodiment, the side wall portion includes a long side wall arranged on each long side and a short side wall arranged on each short side, in which a plurality of first ridges extending along the second direction is further arranged on each short side wall; and/or, a plurality of second ridges extending along the first direction is further arranged on each long side wall.

In one embodiment, on each long side wall, lengths of the plurality of second ridges in the first direction gradually increase along a direction away from the bottom plate portion.

In one embodiment, the first ridges and the second ridges are punched ridge structures formed on the side wall portion through punching.

In one embodiment, the first ridges and/or the second ridges are each a linear ridge structure or a wavy linear ridge structure.

In one embodiment, each of the plurality of first grooves is a one-piece groove body extending across the entire bottom plate portion in the second direction, or each of the plurality of the first grooves includes a plurality of groove bodies sequentially arranged at intervals along the second direction; and each of the plurality of second grooves is a one-piece groove body extending across the entire bottom plate portion in the first direction, or each of the plurality of the second grooves includes a plurality of groove bodies sequentially arranged at intervals along the first direction.

In one embodiment, the plurality of crisscrossed reinforcing grooves comprises punched grooves formed in the bottom plate portion through punching, each punched groove includes a groove bottom and a groove side wall, and a slope angle is formed between the groove bottom and the groove side wall, in which for the plurality of crisscrossed reinforcing grooves, the deeper the depth of a groove body, the smaller the slope angle between the groove bottom and the groove side wall.

In another aspect, an embodiment of the present disclosure provides a backlight module including the backplate as described above.

In one embodiment, the backlight module further includes a light source and a circuit board for supplying power to the light source, the backplate includes a plurality of the first grooves and a plurality of the second grooves, and the circuit board is arranged in one of the plurality of first grooves.

In another aspect, an embodiment of the present disclosure provides a display device including the backlight module as described above.

DETAILED DESCRIPTION

The principles and features of the present disclosure will be described below in conjunction with drawings. The embodiments cited are merely used for explaining the present disclosure, rather than limiting the scope of the present disclosure.

In the related art, if the bottom surface of the backplate is a flat plane, the backplate is prone to be deformed, especially for large-sized display products, thin display products, curved display products, etc., and the stress on the backplate or frame may cause the backplate to be partially deformed due to bending or uneven force. On the other hand, if additional reinforcement ribs are fixed on the backplate, the entire display product will become heavier, so that the heavy backplate is more prone to be deformed, which is not conducive for a user to move it. This will result in increases in cost and thickness, and lightening and thinning of display device may not be achieved.

For display products in the related art, especially for large-size display products, thin display products, or curved display products, there is a problem that the backplate or frame will be deformed due to stress during use. The embodiment of the present disclosure provides a backplate, a backlight module and a display device, which are capable of solving the problem that the backplate or frame will be deformed due to stress.

Figure 1:
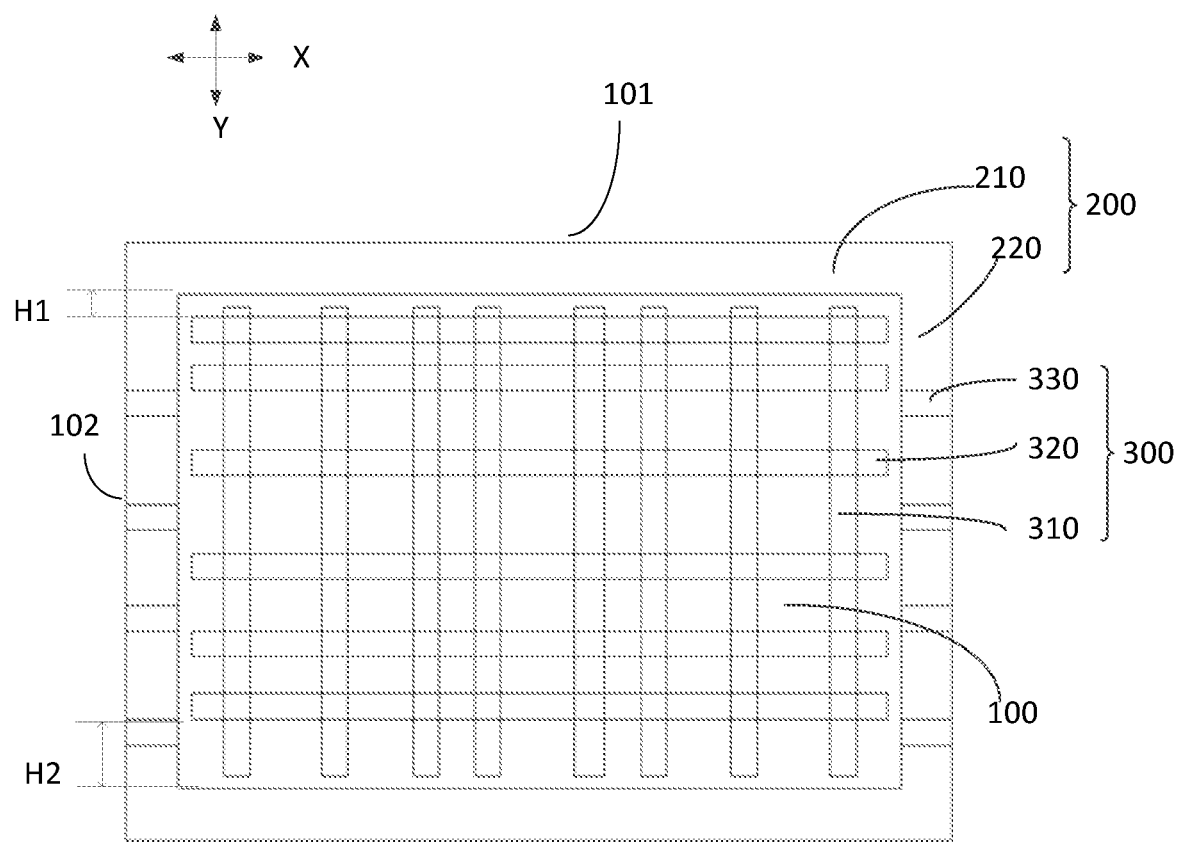
FIG. 1 is a schematic view showing the structure of a backplate according to an embodiment of the present disclosure.

As shown in FIG. 1, an embodiment of the present disclosure provides a backplate, including: a bottom plate portion 100 and a side wall portion 200 surrounding the bottom plate portion 100, in which the bottom plate portion 100 is provided with a plurality of crisscrossed reinforcing grooves 300.

In the above solution, the backplate can be strengthened by providing a plurality of crisscrossed reinforcing grooves 300 in the bottom plate portion 100 of the backplate, and the stress on the backplate can be buffered by the reinforcing grooves 300, thereby solving the problem that the backplate or frame will be deformed due to stress concentration. In addition, compared with the setting of the reinforcing ribs additionally fixed on the backplate in the related art, the setting of the reinforcing groove 300 will not cause increases in thickness and cost, and thus still lightening and thinning may be achieved.

The typical examples of the backplate according to the embodiment of the present disclosure will be illustrated in conjunction with the drawings hereafter.

In one embodiment, as shown in FIG. 1, the bottom plate portion 100 includes two long sides 101 arranged opposite to each other and two long short sides 102 arranged opposite to each other, in which the long sides 101 extend along a first direction, the short sides 102 extend along a second direction perpendicular to the first direction, and the length of the long side 101 is greater than the length of the short side 102. The plurality of reinforcing grooves 300 includes a plurality of first grooves 310 sequentially arranged along the first direction and each having a groove body extending along the second direction; and a plurality of second grooves 320 sequentially arranged along the second direction and each having a groove body extending along the first direction.

A display screen of a display product is generally designed to have a shape having a long side and a short side, and accordingly, a backplate also generally has a long side 101 and a short side 102. For display products, especially for large-sized display products, thin display products or curved display products, the stress on the backplate or frame during use mainly comes from the stresses in the extending direction (X direction) of the long side 101 and in the extending direction (Y direction) of the short side 102. Therefore, by adopting the above solution, the crisscrossed reinforcing grooves 300 arranged on the bottom plate portion 100 of the backplate are mainly designed as a plurality of first grooves 310 and a plurality of second grooves 320. The plurality of first grooves 310 and the plurality of second grooves 320 divide the bottom plate portion 100 of the backplate into a grid array structure. The plurality of first grooves 310 are sequentially arranged at intervals along the extending direction (i.e., the first direction, hereinafter referred to as the X direction) of the long side 101, and the extending direction of the groove body of each first groove 310 is identical to the extending direction of the short side 102. The plurality of first grooves 310 is mainly configured to solve the problem of the stress concentration of the backplate in the X direction. The plurality of second grooves 320 are sequentially arranged at intervals along the extending direction (i.e., the second direction, hereinafter referred to as the Y direction) of the short side 102, and the extending direction of the groove body of each second groove 320 is identical to the extending direction of the long side 101. The plurality of second grooves 320 is mainly configured to solve the problem of the stress concentration of the backplate in the Y direction. Therefore, the backplate according to this embodiment can improve the stress concentration phenomenon of the backplate or frame during use.

It should be noted that, in the above solution, the plurality of first grooves 310 being sequentially arranged at intervals along the first direction means that the plurality of first grooves 310 may be sequentially arranged at intervals substantially along the first direction. The groove body of each first groove 310 extending along the second direction means that the extending direction of the groove body of the first groove 310 may be substantially along the second direction, and it is not required that the extending direction of the groove body of the first groove 310 is completely parallel to the short side 102, that is, there may also be an oblique angle between the them. For example, an inclination angle between the extending direction of the groove body of the first groove 310 and the extending direction of the short side 102 may be 15° to 30°. Similarly, the plurality of second grooves 320 being sequentially arranged at intervals along the second direction means that the plurality of second grooves 320 may be sequentially arranged at intervals substantially along the second direction. The groove body of each second groove 320 extending along the first direction means that the extending direction of the groove body of the second groove 320 may be substantially along the first direction, and it is not required that the extending direction of the groove body of the second groove 320 is completely parallel to the long side 101, that is, there may also be an oblique angle between the them. For example, an inclination angle between the extending direction of the groove body of the second groove 320 and the extending direction of the long side 101 may be 15° to 30°. In addition, there may be a right angle or an oblique angle between the extending direction of the first groove 310 and the extending direction of the second groove 320.

It should be understood that, in practical applications, if the display product has a non-rectangular shape, but other irregular shapes, such as a circular shape, the extending direction of each groove in the plurality of crisscrossed reinforcing grooves 300 may be determined according to the direction of the stress on the backplate, and thus is not limited herein.

In one embodiment, in the plurality of first grooves 310, a depth of the groove body of the first groove 310 proximate to a center of the backplate is greater than a depth of the groove body of the first groove 310 proximate to the short side 102 of the backplate.

For display products, especially for large-sized display products, thin display products or curved display products, the backplate or frame is subjected to the stress in the long direction (i.e., in the X direction) during use. In the X direction, the stress at the center of the backplate is greater than the stress at the side of the backplate. Therefore, by adopting the above solution, in the plurality of first grooves 310, the depth of the groove body of the first groove 310 proximate to the center of the backplate is greater than the depth of the groove body of the first groove 310 proximate to the short side 102 of the backplate. The first groove 310 having a deeper groove body proximate to the center of the backplate needs to buffer a larger magnitude of deformation and thus the depth of the groove body is relatively large, while the first groove 310 proximate to the short side 102 is not prone to be deformed and thus the depth of the groove body can be relatively small. Therefore, the plurality of first grooves 310 can be designed according to the stress distribution of different regions of the backplate, so that the stress can be more evenly distributed to different regions of the backplate.

In one embodiment, in the plurality of first grooves 310, depths of the groove bodies of the plurality of first grooves 310 gradually decrease along a direction from a center of the backplate to each short side 102 of the backplate.

In the X direction, the closer the backplate is to its central region, the greater the stress it receives, and the stress of the backplate gradually decreases from the center of the backplate to each of the two short sides 102. Therefore, by adopting the above technical solution, the first grooves 310 are correspondingly designed to be closer to the center of the backplate, the deeper the depth of the groove body of the first groove 310, and the greater the magnitude of buffer deformation; and to be closer to each short side 102 of the backplate, the smaller the depth of the groove body of the first groove 310. As a result, the stress distributes more uniformly on different regions of the backplate, and thus the backplate is not prone to be deformed.

In this embodiment, the minimum value of the depths of the groove bodies of the plurality of first grooves 310 may be, for example, greater than 1 mm and less than 5 mm. In addition, the maximum value of the depths of groove bodies of the plurality of first grooves 310 may be, for example, greater than 10 mm and less than 40 mm. In other words, among the plurality of first grooves 310, the depth of the groove body of the first groove 310 has the smallest depth of the groove body of 1 mm to 5 mm, and the depth of the groove body of the first groove 310 has the largest depth of the groove body of 10 mm to 40 mm.

It should be noted that, the specific range of the depth of the groove body of the first grooves 310 can be appropriately selected according to the product size of the backplate, and is not limited to the size range provided above.

Figure 3:
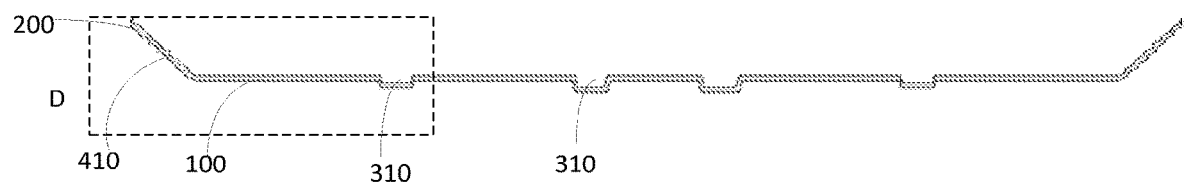
FIG. 3 is a sectional view taken along the direction B-B in FIG. 2.

In addition, in the X direction, the closer the backplate is to its central region, the greater the stress it receives. In order to make the stress distribute on different regions of the backplate more uniformly, in another embodiment, as shown in FIG. 3, in the plurality of first grooves 310, pitches between every two adjacent first grooves 310 may gradually increase along a direction from a center of the backplate to each short side 102 of the backplate.

By adopting the above solution, the density of the first groove 310 arranged at the center of the backplate greater than the density of the first groove 310 arranged proximate to the short side 102 of the backplate, so that the stress can be more uniformly distributed on different regions of the backplate.

In addition, in one embodiment, in the plurality of first grooves 310, a minimum pitch between two adjacent first grooves 310 is less than or equal to one fourth of a length of the long side 101, and a maximum pitch between two adjacent first grooves 310 is less than or equal to one third of a length of the long side 101.

By adopting the above solution, if the pitches between every two adjacent first grooves 310 are too large, the effect of relieving the stress unevenness will be significantly reduced. Therefore, in the plurality of first grooves 310, a minimum pitch between two adjacent first grooves 310 should be less than or equal to one fourth of a length of the long side 101, and a maximum pitch between two adjacent first grooves 310 should be less than or equal to one third of a length of the long side 101.

In addition, it should be noted that, in consideration of the stress distribution on the central region and side region of the backplate in the X direction, each second groove 320 is designed to extend in the X direction, and each second groove 320 can also be designed such that the depth of groove body in the middle of backplate is greater than the depth of groove body in both ends of backplate. That is, the depth of the groove body of the second groove 320 proximate to the center of the backplate is greater than the depth of the groove body proximate to the short side 102 of the backplate.

In addition, in one embodiment, the two long sides 101 include a top long side located on the top and a bottom long side located on the bottom when the short sides 102 of the backplate are in an upright state. In the plurality of second grooves 320, the depths of the groove bodies of the plurality of second grooves 320 are identical to each other.

By adopting the above solution, the backplate of the large-size, ultra-thin, or curved display devices is in an upright state during use, and the stress in the X direction is more prone to make the long side deform. Thus, each second groove 320 may be designed so that the depth of the groove body is identical to each other.

It should be understood that, in this embodiment, if the short sides 102 of the display device is large in size, in order to further prevent the backplate from being deformed by stress, it may also be as follows:
- in the plurality of second grooves 320, a depth of the second groove 320 proximate to the top long side is greater than a depth of the second groove 320 proximate to the bottom long side; and/or,
- in the plurality of second grooves 320, pitches between every two adjacent second grooves 320 gradually increase along a direction from the top long side to the bottom long side.

In this way, the backplate is in an upright state during use of the display device, the region proximate to the bottom long side is subjected to greater pressure from the overall display device, and thus slotting should be avoided as much as possible. Therefore, on the side proximate to the bottom long side, the depth of the groove body of the second groove 320 is small and/or the slotting density is small, thereby preventing deformation. In addition, the region proximate to the top long side is susceptible to stress in the X direction. Therefore, on the side proximate to the top long side, the depth of a groove body of the second groove 320 is large and/or the slotting density is large, thereby preventing deformation.

In addition, as shown in FIG. 1, in one embodiment, in the plurality of second grooves 320, the second groove 320 most proximate to the top long side is spaced apart from the top long side by a first distance H1 in the second direction, the second groove 320 most proximate to the bottom long side is spaced apart from the bottom long side by a second distance H2 in the second direction, and the first distance H1 is less than the second distance H2.

By adopting the above solution, the backplate is in an upright state during use of the display device, the region proximate to the bottom long side is subjected to greater pressure from the overall display device, and thus slotting should be avoided as much as possible to prevent deformation. The region proximate to the top long side is prone to be subjected to the stress in the X direction, and thus a second groove 320 may be provided to prevent deformation. Therefore, in the above solution, the distance between the second groove 320 most proximate to the top long side and the top long side is less than the distance between the second groove 320 most proximate to the bottom long side and the bottom long side.

Figure 5:
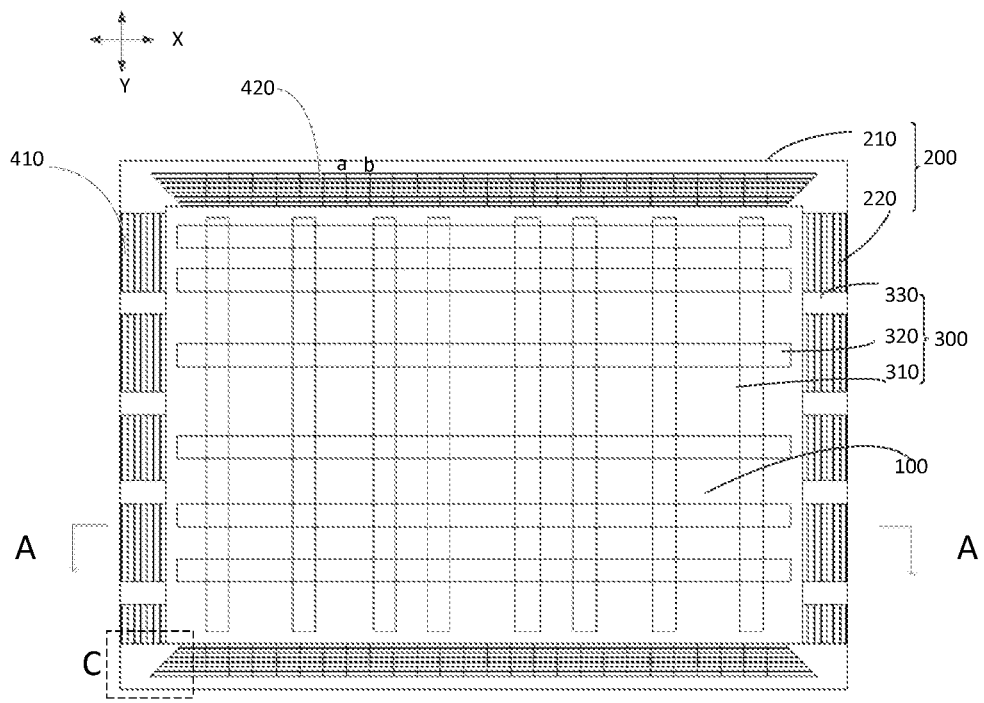
FIG. 5 is a schematic view showing the structure of a backplate according to still another embodiment of the present disclosure.
Figure 6:
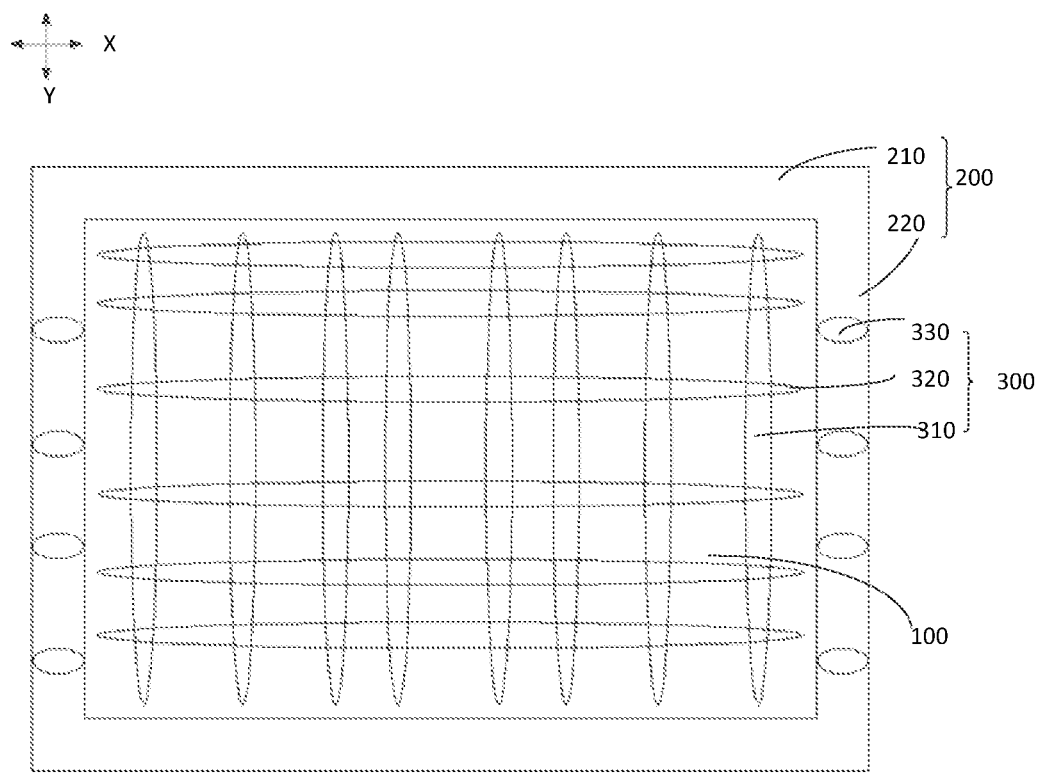
FIG. 6 is a schematic view showing the structure of a backplate according to still another embodiment of the present disclosure.
Figure 11:
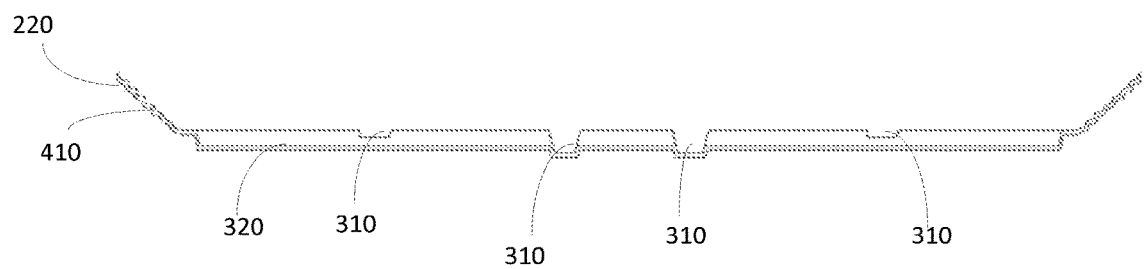
FIG. 11 is a sectional view taken along the direction A-A in FIG. 5.

In addition, FIG. 11 is a sectional view taken along the direction A-A in FIG. 5. In one embodiment, as shown in FIG. 11, a depth of a groove body of each second groove 320 is less than a maximum value of the depths of the groove bodies of the plurality of first grooves 310 and greater than a minimum value of the depths of the groove bodies of the plurality of first grooves 310.

By adopting the above solution, since the stress in the X direction on the backplate gradually increases from the short side 102 of the backplate to the center of the backplate, the second groove 320 can play a role in buffering the stress from the first groove 310 having the minimum depth of the groove body proximate to the short side 102 to the first groove 310 having the maximum depth of the groove body proximate to the center of the backplate.

In this embodiment, the depths of the groove bodies of the plurality of second groove 320 may be, for example, greater than 5 mm and less than 10 mm. It should be understood that, the specific value range of the depths of the groove bodies of the plurality of second groove 320 may be selected according to the product size, and is not limited to the size range provided above.

In addition, as shown in FIGS. 1 to 8, in the embodiment of the present disclosure, the side wall portion 200 includes a long side wall 210 arranged on the long side 101 and a short side wall 220 arranged on the short side 102, in which on the short side wall 220, a plurality of third grooves 330 is sequentially arranged along the second direction, and each of the plurality of third grooves 330 extends along the first direction, and each second grooves 320 is arranged in such a manner as to face a gap between two corresponding third grooves 330 adjacent to each other.

By adopting the above solution, a plurality of third grooves 330 is also arranged on the short side wall 220 of the side wall portion 200 of the backplate, which is mainly used to prevent the deformation of the short side wall 220 corresponding to the two short sides 102. In addition, the third groove 330 in the short side wall 220 and the first groove 310 in the bottom plate portion 100 are crisscrossed, to prevent the third groove 330 and the first groove 310 from extending across the entire bottom plate portion of the backplate in the X direction and from further weakening the overall strength of the backplate.

It should be noted that the depths of the grooves of the plurality of third grooves 330 may be identical to each other. It should also be noted that, the number and pitch of the first groove 310, the second groove 320, and the third groove 330 can be determined according to the size of the display device, and thus not limited herein.

In addition, the specific shapes of the first groove 310, the second groove 320, and the third groove 330 are not limited, either. For example, the shape of the first groove 310, the second groove 320, and the third groove 330 may be an elongated shape, or an ellipse shape, etc.

Figure 7:
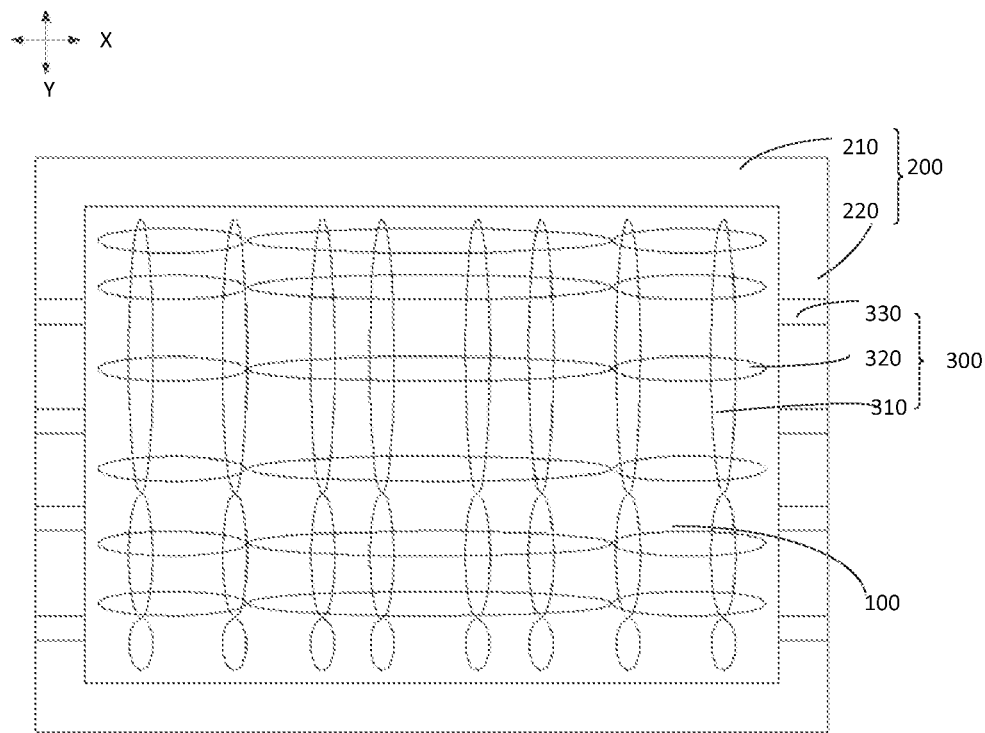
FIG. 7 is a schematic view showing the structure of a backplate according to still another embodiment of the present disclosure.
Figure 8:
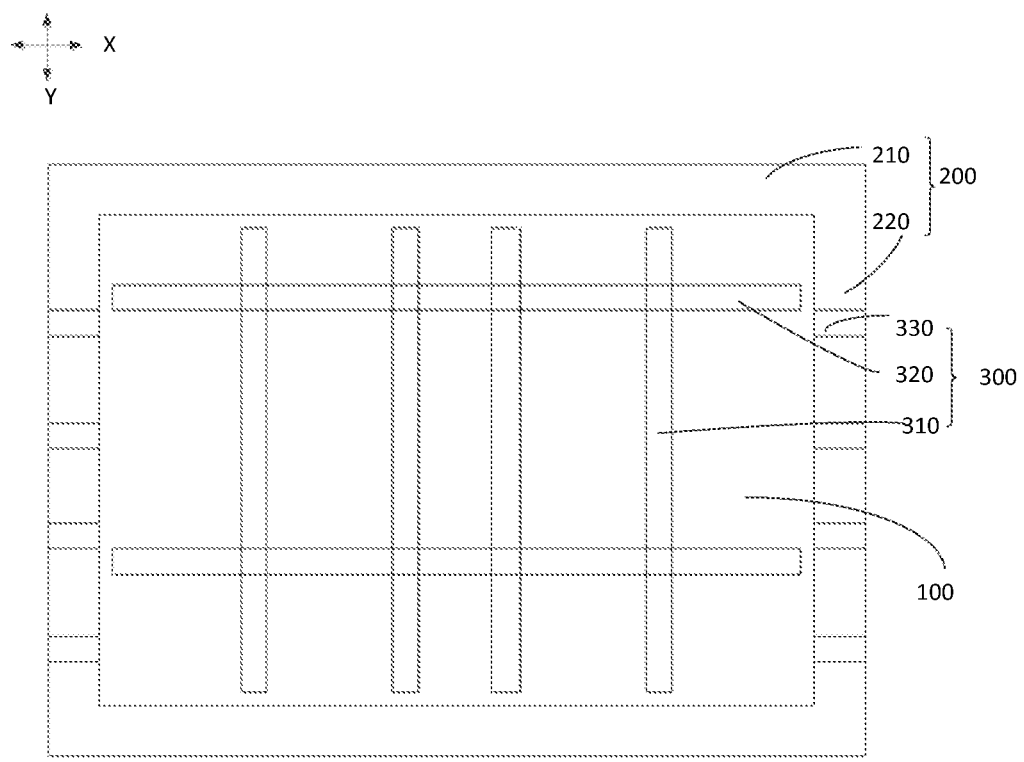
FIG. 8 is a schematic view showing the structure of a backplate according to still another embodiment of the present disclosure.
Figure 9:
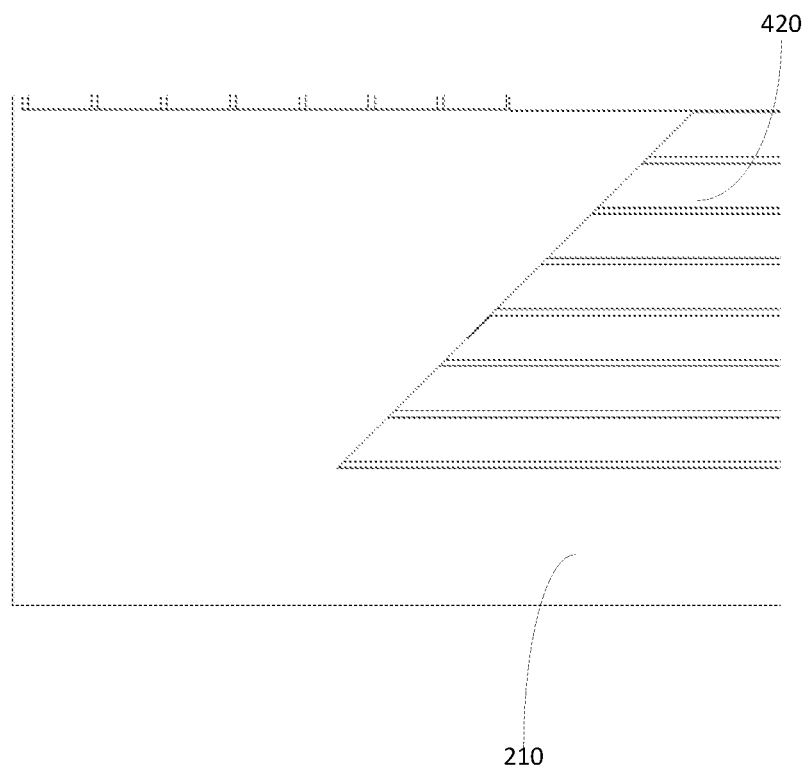
FIG. 9 is a partially enlarged view showing a portion C in FIG. 5.

In addition, each of the plurality of first grooves 310 may be a one-piece groove body extending across the entire bottom plate portion in the second direction. As shown in FIGS. 1 and 2 to 8, the first groove 310 is the one-piece groove body. Alternatively, each of the plurality of first grooves 310 may also include a plurality of groove bodies sequentially arranged at intervals along the second direction. As shown in FIG. 7, each of the plurality of first grooves 310 comprises a row of grooves composed of a plurality of groove bodies having multiple shapes.

Similarly, each of the plurality of second grooves 320 may be a one-piece groove body extending across the entire bottom plate portion in the first direction. As shown in FIGS. 1 and 2 to 8, the second groove 320 the one-piece groove body. Alternatively, each of the plurality of second grooves 320 may also include a plurality of groove bodies sequentially arranged at intervals along the first direction. As shown in FIG. 7, each of the plurality of second grooves 320 comprises a row of grooves composed of a plurality of groove bodies having multiple shapes.

Figure 2:
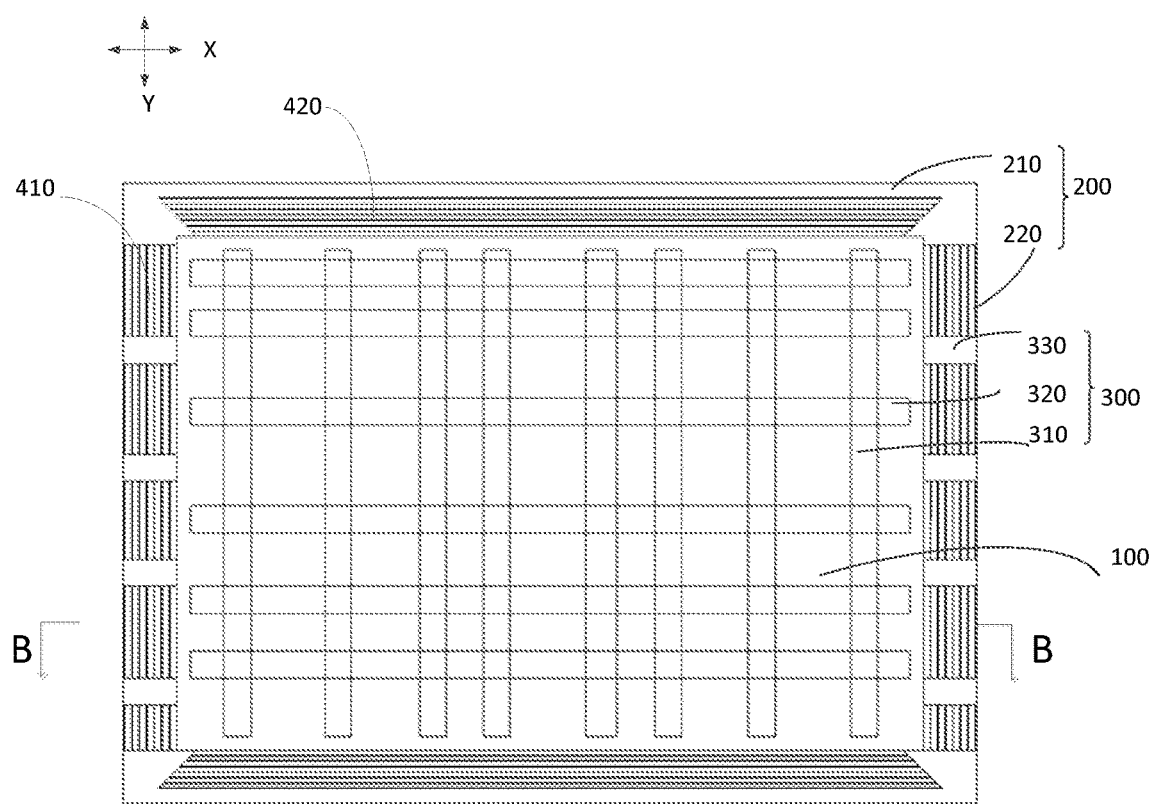
FIG. 2 is a schematic view showing the structure of a backplate according to another embodiment of the present disclosure.
Figure 4:
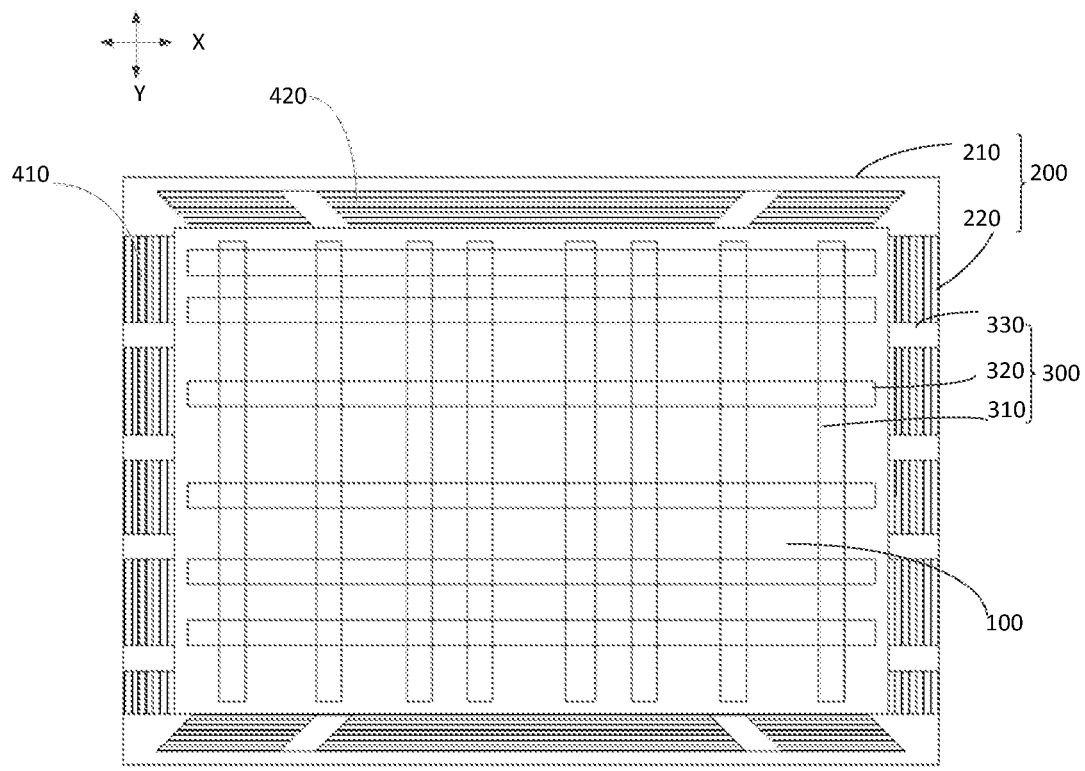
FIG. 4 is a schematic view showing the structure of a backplate according to still another embodiment of the present disclosure.

In addition, as shown in FIG. 2 and FIG. 4 to FIG. 5, in still another embodiment of the present disclosure, a plurality of first ridges 410 extending along the second direction may be further arranged on each short side wall 220; and/or, a plurality of second ridges 420 extending along the first direction are further arranged on each long side wall 210.

By adopting the above solution, a plurality of first ridges 410 arranged on the short side walls 220 of the backplate and/or a plurality of second ridges 420 arranged on the long side walls 210 of the backplate is capable of increasing the strength of the side wall portion 200 and preventing deformation due to stress in the X direction.

It should be noted that, in the embodiment of the present disclosure, only a plurality of first ridges 410 may be arranged on each short side wall 220 of the backplate; only a plurality of second ridges 420 may be arranged on each long side wall 210 of the backplate; or a plurality of first ridges 410 may be arranged on each short side wall 220 of the backplate and a plurality of second ridges 420 may be arranged on each long side wall 210 of the backplate.

In one embodiment, as shown in FIG. 2, on each long side wall 210, lengths of the plurality of second ridges 420 in the first direction gradually increase along a direction from the bottom plate portion 100 to the bottom plate portion 100.

By adopting the above solution, the lengths of the plurality of second ridges 420 arranged on each long side wall 210 gradually increase along a direction from the bottom plate portion 100 to the long side wall 210. In this way, different positions of the backplate may have different stress to be received. For display products, especially curved display products, the longer the long side 101 of the backplate is, the easier it is to deform. Therefore, by adopting the above-mentioned structure, it is possible to prevent stress from being concentrated on one point and causing deformation of the backplate.

It should be noted that, each first ridge 410 and each second ridge 420 may a single continuous ridge structure; or may be a segmented ridge structure, for example, each is composed of several ridges. Among them, in the structural schematic views shown in FIG. 2 and FIG. 5, the first ridges 410 and the second ridges 420 are both a single continuous ridges structure. In addition, in the structural schematic view shown in FIG. 4, the second ridges 420 is a segmented ridge structure.

In addition, for example, the first ridges 410 and the second ridges 420 may be punched ridge structures formed in the side wall portion 200 through punching.

By adopting the above scheme, the first ridges 410 and the second ridges 420 are formed in the side wall portion 200 through punching, and they may be integrally formed with the side wall portion 200 of the backplate to simplify their manufacturing process. It should be understood that, in practical applications, the first ridges 410 and the second ridges 420 may also be separately manufactured and formed in the side wall portion 200 by other methods.

In addition, in the embodiment of the present disclosure, the specific shapes of the first ridges 410 and the second ridges 420 are also not limited herein. Exemplarily, the first ridges 410 and the second ridges 420 may have a shape such as, a linear ridge structure or a wavy linear ridge structure. Among them, in the structural views shown in FIG. 2 and FIG. 4, the first ridges 410 and the second ridges 420 are linear ridge structures. In the structural schematic view shown in FIG. 5, the first ridges 410 and the second ridges 420 are wavy linear ridge structures, in which the wave peaks a and wave trough b of the wave lines are shown in FIG. 5.

Figure 10:
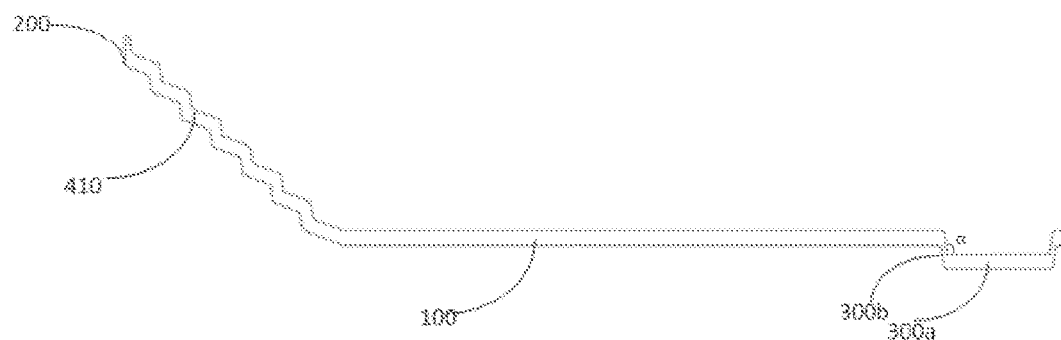
FIG. 10 is a partially enlarged view showing a portion D in FIG. 3.

In addition, FIG. 10 shows a partially enlarged view of a portion D in FIG. 3, which illustrates a partial schematic view of a cross section of the bottom plate portion 100 of the backplate. As shown in FIG. 10, the plurality of reinforcing grooves 300 is a punched groove formed in the bottom plate portion 100 through punching. The punched groove includes a groove bottom 300a and a groove side wall 300b, and a slope angle is formed between the groove bottom 300a and the groove side wall 300b, in which for the plurality of crisscrossed reinforcing grooves, the deeper the depth of the groove body, the smaller the slope angle between the groove bottom 300a and the groove side wall 300b.

By adopting the above solution, the reinforcing groove 300 (including the first groove 310, the second groove 320, and the third groove 330) can be integrally formed in the backplate by a punching process, thereby simplifying the manufacturing process. In addition, the larger the slope angle a is, the more it contributes to the release of stress. Therefore, as for each reinforcement groove 300, the slope angle $\alpha$ between the groove bottom 300a and the groove side wall 300b of the reinforcement groove 300 having a large depth of a groove body is less than the slope angle $\alpha$ between the groove bottom 300a and the groove side wall 300b of the reinforcement groove 300 having a small depth of a groove body. For example, for a plurality of first grooves 310, the depth of the groove body of the first groove 310 proximate to the center of the backplate is greater than the depth of the groove body of the first groove 310 proximate to the short side 102 of the backplate, and thus the slope angle $\alpha 1$ of the first groove 310 proximate to the center of the backplate is less than the slope angle $\alpha 2$ of the first groove 310 proximate to the short side 102 of the backplate. Similarly, the depth of the groove body of the second groove 320 is less than the maximum value of the depths of the groove bodies of the plurality of first grooves 310, and thus the slope angle $\alpha 3$ of the second groove 320 is greater than the slope angle $\alpha 1$ of the first groove 310 having the maximum value of the depths of the groove bodies. Similarly, the depth of the groove body of each second groove 320 is greater than the minimum value of the depths of the groove bodies of the plurality of first groove s310, the slope angle α3 of the second groove 320 is less than the slope angle α2 of the first groove 310 having the minimum value of the depths of the groove bodies.

It should be noted that when the backlight module is assembled with the backplate according the embodiment of the present disclosure, which is provided with the plurality of reinforcing grooves 300, the reinforcing groove 300 can also be used to accommodate some circuit boards or electrical wires, etc. to make full use of space.

For the backplate according the embodiment of the present disclosure, the reinforcing groove 300 provided on the backplate can be reasonably designed in the depth of the groove body, the slotting density or the like, so that the stress on the backplate can be evenly distributed on the different regions. In addition, providing the third grooves 330 and the ridge structure in the side wall portion 200 is capable of subjecting different positions of the side wall portion 200 to different stresses, thereby preventing the deformation of the substrate due to the stress concentration.

In addition, an embodiment of the present disclosure further provides a backlight module including a backplate according to the embodiment of the present disclosure.

Figure 15:
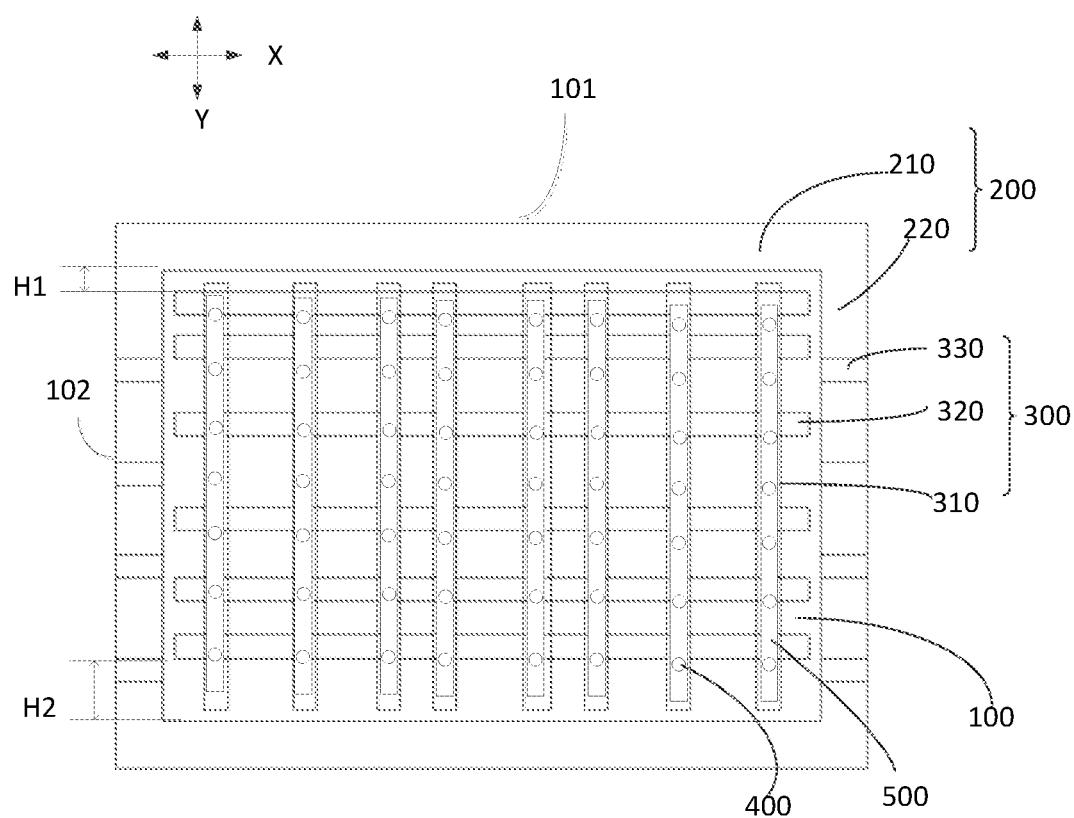
FIG. 15 is a front view showing a backplate in a backlight module according to an embodiment of the present disclosure.

In the embodiment of the present disclosure, as shown in FIG. 15, the backlight module further includes a light source 400 and a circuit board 500 for supplying power to the light source 400, in which the circuit board 500 is arranged in one of the plurality of first grooves 310.

By adopting the above solution, when the backlight module is assembled with the reinforcing groove 300, the reinforcing groove 300 can also be used to accommodate some circuit boards or electrical wires, etc. to make full use of space. Specifically, the circuit board may be arranged in one of the plurality of first grooves 310 in the backplate, thereby reasonably using space, so that the flatness of the optical film on the backplate is better, and the optical characteristics are not changed. For example, the backlight module may be a direct type backlight module. As shown in FIG. 15, the light source 400 and the circuit board 500 are arranged in each of the first grooves 310. Among them, FIG. 15 merely schematically shows a part of the light source 400 and the circuit board 500. It should be understood that the light source 400 and the circuit board 500 can be set according to the requirements for the light source arrangement of the direct type backlight module.

Figure 12:
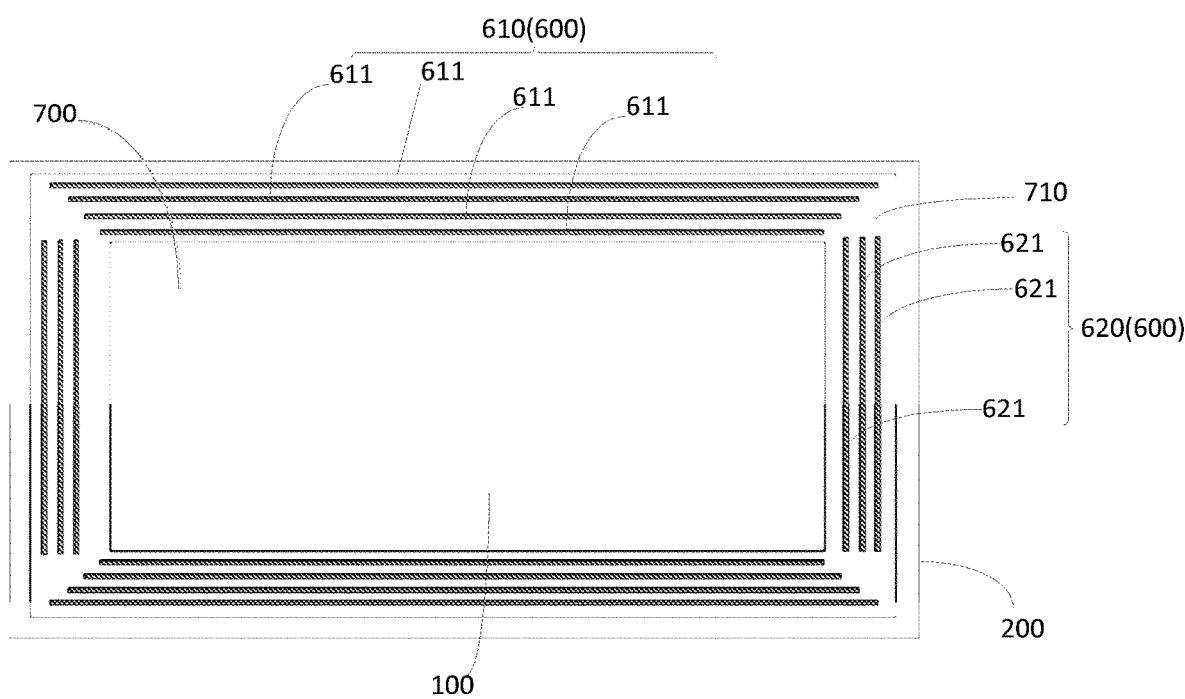
FIG. 12 is a front view showing a backlight module according to an embodiment of the present disclosure.
Figure 13:
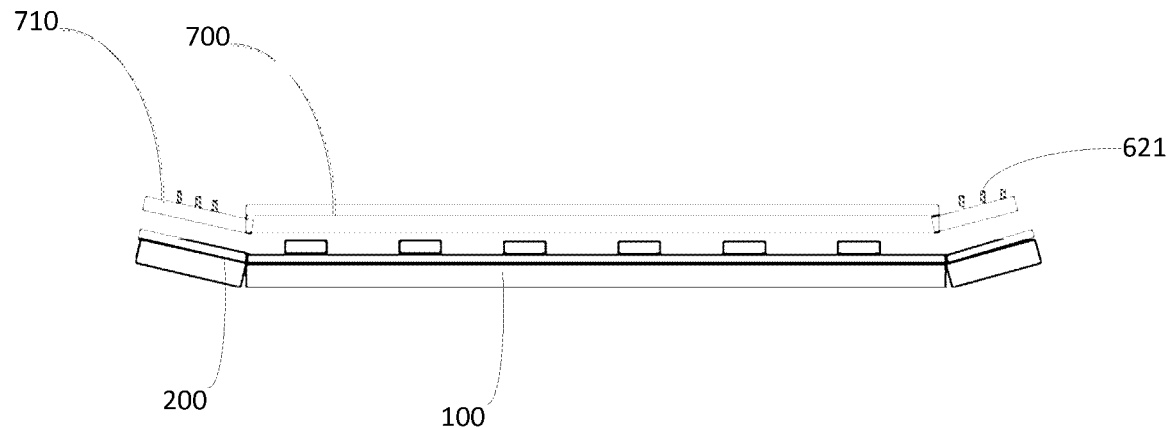
FIG. 13 is a side view of FIG. 12.

In addition, FIG. 12 is a front view showing the structure of the backlight module according to an embodiment of the present disclosure. FIG. 13 is a side view of FIG. 12. As shown in FIG. 12 and FIG. 13, the backlight module further includes an optical film 700 and a frame arranged above the backplate. A n optical structure 600 is arranged above the backplate, and the optical structure 600 may be arranged on the optical film 700 or arranged on the border. Among them, the optical structure 600 includes two first portions 610 corresponding to the two long sides 101 of the backplate, and two second portions 620 corresponding to the two short sides 102 of the backplate. The first portion 610 includes a plurality of first optical ridges 611 extending along the extending direction of the long side 101, and the second portion 620 includes a plurality of second optical ridges 621 extending along the extending direction of the short side 102. The widths of the plurality of first optical ridges 611 are identical to each other. On each first portion 610, the lengths of the plurality of first optical ridges 611 gradually increase along a direction from the side of the backplate to the center of the backplate. On each second portion 620, the plurality of second optical ridges 621 have an identical width and an identical length.

It should be noted that, in the above solution, the optical structure 600 may be located on a one-piece optical film layer of the optical film material 700. At this time, the edge region of the optical film layer is designed with a special shape at a position corresponding to the side wall portion of the backplate, so that an oblique side 710 is designed in the edge region of the optical film layer. For example, the optical film 700 may include a diffusion sheet or the like, and the diffusion sheet is provided with oblique side 710 at a position corresponding to a side wall portion of the backplate. The optical structure is located on the oblique side 710 of the diffusion sheet, or the optical structure may also be located on the frame structure.

Figure 14:
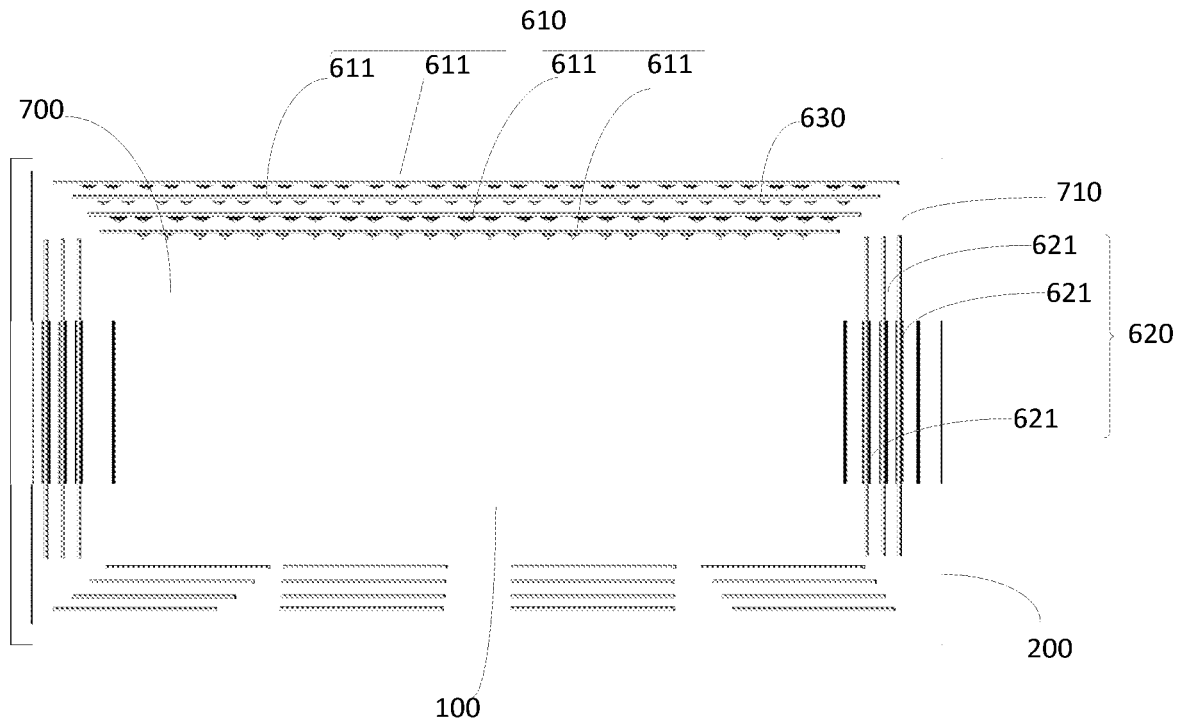
FIG. 14 is a front view showing a backlight module according to still another embodiment of the present disclosure.

In addition, as shown in FIG. 14, in the embodiment of the present disclosure, the optical structure may further include an optical dot structure 630. For example, as shown in FIG. 14, a plurality of optical dots may also be distributed on each of the first optical ridges 611 and/or each of the second of the optical ridges 621. The shape of the optical dots may be triangular or other shapes, but is not particularly limited herein. The optical dots may be manufactured integrally with the first optical ridges 611 and/or the second optical ridges 621. Specifically, for example, when the first optical ridges 611 is arranged on a certain optical film layer of the optical film 700, the first optical ridges 611, the optical dot structure 630, and the optical film layer may be manufactured integrally. For example, the optical film layer may be a rigid plate-like film layer formed through injection molding. Alternatively, the optical dot structure 630 may also be a special material layer separately formed on the optical film layer, and for example, it may be diffuse particles, prisms, and other materials, patterns, etc. that meet optical requirements.

In the above solution, the optical dot structure 630 can play a role of optical modification, so that the optical characteristics of the edge region of the backlight module are similar to that of the middle region of the backlight module. In addition, when the optical film 700 has a rigid plate-like film layer structure, it can have a certain strength to the backplate, and can be prevented from being easily bent by external forces. In addition, when the optical film layer is a rigid plate-like film layer, the structure of the oblique side 710 is subjected to a special shape processing to be matching the side wall portion 200 of the backplate, so that the toughness of the optical film 700 can be increased when the curved surface display is implemented.

In addition, an embodiment of the present disclosure further provides a display device including a backlight module according to an embodiment of the present disclosure.

Obviously, the backlight module and the display device according to the embodiments of the present disclosure can also have the beneficial effects brought by the backplate according to the embodiments of the present disclosure.

The above descriptions are optional embodiments of the present disclosure. It should be noted that one skilled in the art would make several improvements and substitutions without departing from the principles of the present disclosure. These improvements and modifications should also be regarded as the protection scope of the present disclosure.

What is claimed is:

1. A backplate, comprising a bottom plate portion and a side wall portion, wherein the bottom plate portion is provided with a plurality of crisscrossed reinforcing grooves;

wherein the bottom plate portion comprises two long sides arranged opposite to each other and extending along a first direction; and two short sides arranged opposite to each other and extending along a second direction perpendicular to the first direction, and a length of the long side is greater than a length of the short side;

wherein the plurality of crisscrossed reinforcing grooves comprises a plurality of first grooves sequentially arranged along the first direction and each having a groove body extending along the second direction; and a plurality of second grooves sequentially arranged along the second direction and each having a groove body extending along the first direction;

wherein in the plurality of first grooves, a depth of the groove body of the first groove proximate to a center of the backplate is greater than a depth of the groove body of the first groove proximate to the short side of the backplate;

wherein the depths of the groove bodies of the plurality of second grooves are all less than a maximum value of the depths of the groove bodies of the plurality of first grooves and greater than a minimum value of the depths of the groove bodies of the plurality of first grooves.

2. The backplate of claim 1, wherein in the plurality of first grooves, the depths of the groove bodies of the plurality of first grooves gradually decrease along a direction from the center of the backplate to each short side of the backplate.

3. The backplate of claim 2, wherein a minimum value of the depths of the groove bodies of the plurality of first grooves is greater than or equal to 1 mm and less than or equal to 5 mm, and a maximum value of the depths of the groove bodies of the plurality of first grooves is greater than or equal to 10 mm and less than or equal to 40 mm.

4. The backplate of claim 1, wherein the depths of the groove bodies of the plurality of second grooves are all greater than 5 mm and less than 10 mm.

5. The backplate of claim 1, wherein in the plurality of first grooves, pitches between every two adjacent first grooves gradually increase along a direction from a center of the backplate to each short side of the backplate.

6. The backplate of claim 5, wherein in the plurality of first grooves, a minimum pitch between two adjacent first grooves is less than or equal to one fourth of a length of the long side, and a maximum pitch between two adjacent first grooves is less than or equal to one third of a length of the long side.

7. The backplate of claim 1, wherein the two long sides comprise a top long side located on the top and a bottom long side located on the bottom when the short sides of the backplate are in an upright state;

wherein the depths of the groove bodies of the plurality of second grooves are identical to each other.

8. The backplate of claim 7, wherein in the plurality of second grooves, the second groove most proximate to the top long side is spaced apart from the top long side by a first distance in the second direction, the second groove most proximate to the bottom long side is spaced apart from the bottom long side by a second distance in the second direction, and the first distance is less than the second distance.

9. The backplate of claim 1, wherein the two long sides comprise a top long side located on the top and a bottom long side located on the bottom when the short sides of the backplate are in an upright state;

wherein in the plurality of second grooves, a depth of the second groove proximate to the top long side is greater than a depth of the second groove proximate to the bottom long side; and/or, in the plurality of second grooves, pitches between every two adjacent second grooves gradually increase along a direction from the top long side to the bottom long side.

10. The backplate of claim 1, wherein the side wall portion comprises a long side wall arranged on each long side and a short side wall arranged on each short side, wherein on each short side wall, a plurality of third grooves is sequentially arranged along the second direction and each of the plurality of third grooves extends along the first direction, and each second groove is arranged in such a manner as to face a gap between two corresponding third grooves adjacent to each other.

11. The backplate of claim 1, wherein the side wall portion comprises a long side wall arranged on each long side and a short side wall arranged on each short side, wherein a plurality of first ridges extending along the second direction is further arranged on each short side wall; and/or, a plurality of second ridges extending along the first direction is further arranged on each long side wall.

12. The backplate of claim 11, wherein on each long side wall, lengths of the plurality of second ridges in the first direction gradually increase along a direction away from the bottom plate portion.

13. The backplate of claim 11, wherein the first ridges and/or the second ridges are each a linear ridge structure or a wavy linear ridge structure.

14. The backplate of claim 11, wherein the first ridges and the second ridges are punched ridge structures formed on the side wall portion through punching.

15. The backplate of claim 1, wherein each of the plurality of first grooves is a one-piece groove body extending across the entire bottom plate portion in the second direction, or each of the plurality of the first grooves comprises a plurality of groove bodies sequentially arranged at intervals along the second direction; and each of the plurality of second grooves is a one-piece groove body extending across the entire bottom plate portion in the first direction, or each of the plurality of the second grooves comprises a plurality of groove bodies sequentially arranged at intervals along the first direction.

16. A backlight module, comprising the backplate of claim 1.

17. The backlight module of claim 16, wherein the backlight module further comprises a light source and a circuit board for supplying power to the light source, the backplate comprises a plurality of first grooves and a plurality of second grooves, and the circuit board is arranged in one of the plurality of first grooves.

18. A display device, comprising the backlight module of claim 16.

19. The backplate of claim 1, wherein the plurality of crisscrossed reinforcing grooves comprises punched grooves formed in the bottom plate portion through punching, each punched groove comprises a groove bottom and a groove side wall, and a slope angle is formed between the groove bottom and the groove side wall, wherein for the plurality of crisscrossed reinforcing grooves, the deeper the depth of the groove body, the smaller the slope angle between the groove bottom and the groove side wall.

* * * * *